(12) United States Patent
Zheng et al.

(10) Patent No.: US 12,099,459 B2
(45) Date of Patent: Sep. 24, 2024

(54) LINK BALANCE ADJUSTMENT SYSTEM AND LINK BALANCE ADJUSTMENT METHOD

(71) Applicant: Shanghai Zhaoxin Semiconductor Co., Ltd., Shanghai (CN)

(72) Inventors: Chunhui Zheng, Beijing (CN); Jintao Wang, Beijing (CN); Jiancong Situ, Beijing (CN); Zeguo Yang, Xi'an (CN); Xiaoping Xu, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 365 days.

(21) Appl. No.: 17/746,031

(22) Filed: May 17, 2022

(65) Prior Publication Data

US 2023/0145625 A1    May 11, 2023

(30) Foreign Application Priority Data

Nov. 8, 2021    (CN) .......................... 202111312782.9

(51) Int. Cl.
  *G06F 13/42*    (2006.01)
  *G06F 9/38*    (2018.01)
  *G06F 13/24*    (2006.01)
  *G06F 13/40*    (2006.01)

(52) U.S. Cl.
  CPC ........ *G06F 13/4282* (2013.01); *G06F 9/3865* (2013.01); *G06F 13/24* (2013.01); *G06F 13/4063* (2013.01)

(58) Field of Classification Search
  CPC .... G06F 13/4282; G06F 9/3865; G06F 13/24; G06F 13/4063
  See application file for complete search history.

(56) References Cited

U.S. PATENT DOCUMENTS

| | | | | |
|---|---|---|---|---|
| 7,864,694 | B1* | 1/2011 | Rosselot | H04L 43/0811 |
| | | | | 370/252 |
| 8,743,715 | B1* | 6/2014 | Eddy | H04J 3/0685 |
| | | | | 370/252 |
| 2008/0137719 | A1* | 6/2008 | Kawamoto | H04L 1/20 |
| | | | | 375/224 |

(Continued)

*Primary Examiner* — Phong H Dang
(74) *Attorney, Agent, or Firm* — McClure, Qualey & Rodack, LLP

(57) ABSTRACT

A link balance adjustment method includes the following steps. A connection port initiates a balance adjustment process through an interrupt signal. A microprocessor provides an adjustment parameter for an external device from a register and transmits the adjustment parameter to the connection port. A measurement signal is initiated by the microprocessor, and the measurement signal enables the connection port to measure the signal quality after the adjustment parameter has been applied by the external device. The microprocessor determines whether the connection port needs to perform a preprocessing. When the microprocessor determines that the connection port needs to perform a preprocessing, the connection port performs the preprocessing and generates preprocessing data. The connection port transmits the preprocessing data to the register. The microprocessor reads the preprocessing data or the signal quality in the register.

20 Claims, 3 Drawing Sheets

(56) References Cited

U.S. PATENT DOCUMENTS

| | | | | |
|---|---|---|---|---|
| 2010/0121413 A1* | 5/2010 | Willerton | ............ | A61N 1/37235 |
| | | | | 607/60 |
| 2011/0043221 A1* | 2/2011 | Lee | ......................... | H04L 12/10 |
| | | | | 324/614 |
| 2012/0317607 A1* | 12/2012 | Wyatt | ..................... | G09G 5/006 |
| | | | | 725/127 |
| 2019/0130815 A1* | 5/2019 | Thien | ...................... | G06F 13/00 |

\* cited by examiner

LINK BALANCE ADJUSTMENT SYSTEM AND LINK BALANCE ADJUSTMENT METHOD

CROSS REFERENCE TO RELATED APPLICATIONS

This application claims priority of China Patent Application No. 202111312782.9, filed on Nov. 8, 2021, the entirety of which is incorporated by reference herein.

BACKGROUND OF THE INVENTION

Field of the Invention

The present disclosure relates to a link adjustment mechanism, and in particular to a link balance adjustment system and a link balance adjustment method.

Description of the Related Art

Generally speaking, high-speed serial applications are traditionally connected to external devices through connection ports to import external device signals and then generate an image. An example of an external device is a display adapter. As the specifications of external devices improve, more data can be transmitted, and image quality increases. Better signal quality is required in the transmission of external device signals.

Therefore, in a high-speed serial application, how to achieve the link balance adjustment to optimize the signal quality of the lane to ensure the accuracy of data transmission has become one of the problems to be solved in the art.

BRIEF SUMMARY OF THE INVENTION

In accordance with one feature of the present invention, the present disclosure provides a link balance adjustment system. The link balance adjustment system includes a connection port and a microprocessor. The connection port is configured to initiate a balance adjustment process through an interrupt signal. The microprocessor is configured to transmit the adjustment parameter to the connection port according to an adjustment parameter of an external device from a register and; wherein the microprocessor initiates a measurement signal, and the measurement signal is used to enable the connection port to measure signal quality after the adjustment parameter is applied by the external device. The microprocessor determines whether the connection port performs a preprocessing. when the microprocessor determines that the connection port performs the preprocessing, the connection port performs the preprocessing and generates preprocessing data; the connection port transmits the preprocessing data to the register; the microprocessor reads the preprocessing data in the register or the signal quality, and the microprocessor determines whether the signal measurement result meets the standard according to the preprocessed data or the signal quality, when the microprocessor determines that the signal measurement result meets the standard, the microprocessor clears the interrupt signal, and marks in the register that the balance adjustment process is complete.

In one embodiment, the adjustment parameter is stored in the register.

In one embodiment, the microprocessor transmits the adjustment parameter to a physical layer of the connection port, and the physical layer transmits the adjustment parameter to the external device through a training sequence.

In one embodiment, the microprocessor initiates the measurement signal, and the measurement signal is used to prompt a logical physical layer in the connection port to control an electrical physical layer to measure the signal quality after the adjustment parameter is applied by the external device.

In one embodiment, when the microprocessor determines that the connection port does not perform the preprocessing, the connection port transmits the signal quality directly to the register, the microprocessor reads the signal quality in the register, regards the signal quality as the signal measurement result, and analyzes the signal measurement result.

In one embodiment, when the microprocessor determines that the signal measurement result does not meet the standard, a new adjustment parameter is generated.

In one embodiment, after the external device receives the adjustment parameter, the external device evaluates the adjustment parameter, when the external device evaluates that the adjustment parameter is not applicable, a corresponding rejection bit in a training sequence is marked wherein the training sequence is sent by the physical layer of the external device, when the training sequence with the marked rejection bit is received by the connection port, the connection port informs the microprocessor that the external device rejects the adjustment parameter through the register.

In one embodiment, when a logical physical layer receives the rejection signal, the logical physical layer writes a rejection flag into the register, and the microprocessor reads the register to acknowledge that the external device evaluates that the adjustment parameter is not applicable.

In one embodiment, the connection port transmits the adjustment parameter to the external device, the microprocessor sets a measurement parameter, the measurement parameter is used to measure the signal quality after the adjustment parameter has been applied by the external device, and the measurement parameter includes a signal measurement target lane, a signal transmission evaluation time for each lane, or a signal quality test parameter.

In one embodiment, when the microprocessor finishes setting the measurement parameter, the microprocessor writes a mark indicating that the measurement parameter setting has been completed in the register, a logical physical layer of the connection port detects that the register includes the mark indicating that the measurement parameter setting is complete, and the logical physical layer controls an electrical physical layer to perform signal measurement according to the measurement parameter.

In accordance with one feature of the present invention, the present disclosure provides a link balance adjustment method. The link balance adjustment method includes the following steps. A connection port initiates a balance adjustment process through an interrupt signal. According to an adjustment parameter of an external device provided by a register, a microprocessor transmits the adjustment parameter to the connection port. A measurement signal is initiated by the microprocessor. The measurement signal enables the connection port to measure the signal quality after the adjustment parameter is applied by the external device. The microprocessor determines whether the connection port needs to perform a preprocessing. When the microprocessor determines that the connection port needs to perform a preprocessing, the connection port performs the preprocessing and generates preprocessing data. The connection port transmits the preprocessing data to the register. The microprocessor reads the preprocessing data in the register or the signal quality. The microprocessor determines whether the signal measurement result meets the standard according to the preprocessed data or the signal quality. When the microprocessor determines that the signal measurement result meets the standard, the microprocessor clears the interrupt signal, and marks in the register that the balance adjustment process is complete.

In one embodiment, the adjustment parameter is stored in the register.

In one embodiment, the link balance adjustment method further includes transmitting the adjustment parameter to a physical layer of the connection port using the microprocessor, wherein the physical layer transmits the adjustment parameter to the external device through a training sequence.

In one embodiment, the link balance adjustment method further includes the microprocessor initiating a measurement signal, wherein the measurement signal is used to prompt the logical physical layer in the connection port to control the electrical physical layer to measure the signal quality after the adjustment parameter is applied by the external device.

In one embodiment, when the microprocessor determines that the connection port does not perform the preprocessing, the connection port transmits the signal quality directly to the register, the microprocessor reads the signal quality in the register, regards the signal quality as the signal measurement result, and analyzes the signal measurement result.

In one embodiment, when the microprocessor determines that the signal measurement result does not meet the standard, a new adjustment parameter is generated.

In one embodiment, after the external device receives the adjustment parameter, the external device evaluates the adjustment parameter. When the external device evaluates that the adjustment parameter is not applicable, a corresponding rejection bit in a training sequence is marked, wherein the training sequence is sent by the physical layer of the external device. When the training sequence with the marked rejection bit is received by the connection port, the connection port informs the microprocessor that the external device rejects the adjustment parameter through the register.

In one embodiment, when a logical physical layer receives the rejection signal, the logical physical layer writes a rejection flag into the register, and the microprocessor reads the register to acknowledge that the external device evaluates that the adjustment parameter is not applicable.

In one embodiment, the link balance adjustment method further includes the connection port transmitting the adjustment parameter to the external device. The microprocessor sets a measurement parameter, which is used to measure the signal quality after the adjustment parameter has been applied by the external device. The measurement parameter includes a signal measurement target lane, a signal transmission evaluation time for each lane, or a signal quality test parameter.

In one embodiment, when the microprocessor finishes setting the measurement parameter, the microprocessor writes a mark indicating that the measurement parameter setting has been completed in the register. The logical physical layer of the connection port detects that the register includes the mark indicating that the measurement parameter setting is complete. The logical physical layer controls the electrical physical layer to perform signal measurement according to the measurement parameter.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

Figure 1:
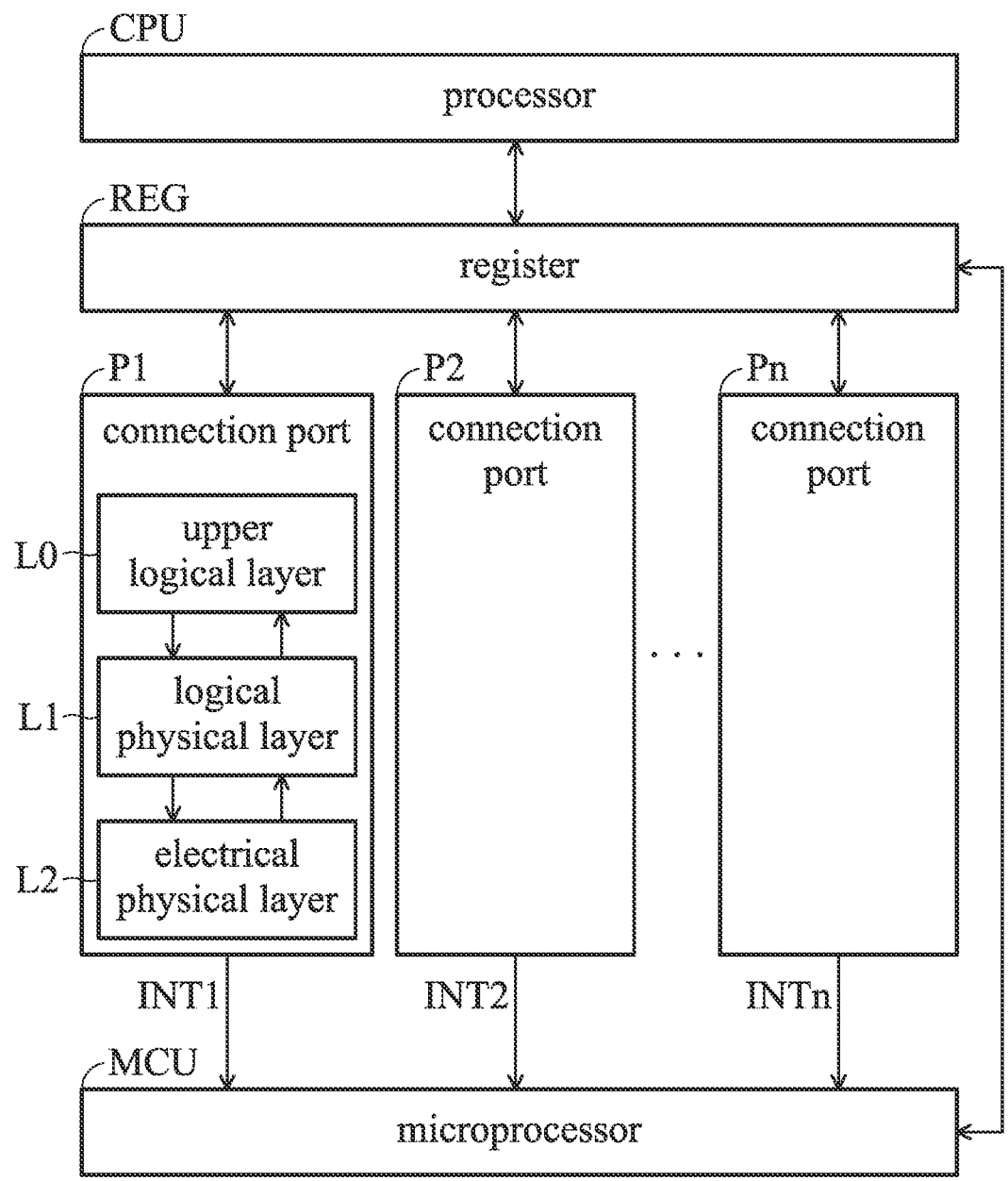
FIG. 1 shows a block diagram of a link balance adjustment system in accordance with one embodiment of the present disclosure.

The following description is a better implementation of the invention. This description is made for the purpose of illustrating the general principles of the invention and should not be taken in a limiting sense. The scope of the invention is best determined by reference to the appended claims.

The present invention is described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The present disclosure can be better understood from the subsequent embodiments and accompanying drawings. It is emphasized that, in accordance with standard industry practice, the various features are not drawn to scale and are used for illustration purposes only. In fact, the dimensions of the various features may be arbitrarily increased or decreased for clarity of discussion. It is also emphasized that the appended drawings illustrate only typical embodiments of this invention and are not to be considered limiting of its scope, for the invention may be applicable to other embodiments.

The following disclosure provides many different embodiments or examples for implementing various features of the present disclosure. Various components and arrangements of the present disclosure, specific examples of which are described below to simplify the description. Of course, these examples are not intended to limit the present disclosure. For example, where the description has a first feature formed on or over a second feature, it may include embodiments where the first feature and the second feature are formed in direct contact, and may also include additional features formed on the first feature between the first feature and the second feature without direct contact between the first feature and the second feature. Furthermore, the present disclosure may repeat reference numerals and/or letters in various instances. This repetition is for simplicity and clarity, and does not in itself prescribe the relationship between the various embodiments and/or configurations discussed.

Furthermore, unless specifically denied, a singular word includes a plural word and vice versa. Whereas, when a number or a range of numbers is described in terms of "about", "approximately" or similar terms, such terms are intended to cover reasonable numbers including the stated number, such as +/−10% of the stated number or within this Other values understood by those skilled in the art.

In one embodiment, please refer to FIG. 1, which shows a block diagram of a link balance adjustment system 100 in accordance with one embodiment of the present disclosure. In one embodiment, the link balance adjustment system 100 includes a connection port P1 and a microprocessor MCU. In one embodiment, the connection port P1 can be connected to an external device, such as a display adapter, a network card device, a sound card, etc., which is for example, not limited thereto.

In one embodiment, the link balance adjustment system 100 includes a processor CPU, a register REG, a plurality of connection ports P1 to Pn, and a microprocessor MCU. In one embodiment, the elements in each of the connection ports P1 to Pn can be the same or different.

In one embodiment, the connection port P1 includes physical layer and upper layer logic. The physical layer is divided into a logical physical layer L1 and an electrical physical layer L2 and an upper logical layer L0. The upper logical layer L0 is, for example, a data-link layer. The connection port P1 is electrically coupled to the microprocessor MCU and the register REG, respectively. The microprocessor MCU is electrically coupled to the register REG. The register REG is electrically coupled to the processor CPU.

In one embodiment, each connection port P1 to Pn represents an independent System on a Chip (SoC) connection path, which mainly includes a logical physical layer L1, an electrical physical layer L2, and an upper layer logical L0 (e.g., data-link layer, etc.). In the process of equalizing and optimizing the signal quality of the lane, the connection ports P1 to Pn mainly involve the logical physical layer L1 and the electrical physical layer L2 in the process.

In the process of balancing and optimizing the signal quality of the lane, the logical physical layer L1 mainly includes three functions: first, the dedicated training sequence transmits to the other party (such as an external device) the relevant information (such as adjustment parameters) that the microprocessor MCU provides for balancing and optimizing the lane, and the other party can use this information to adjust the electrical parameters of the transmitter; Second, according to the requirements of the microprocessor MCU, control the electrical physical layer L2 to measure the relevant parameters (such as electrical parameters) of the received signal quality, and store the electrical parameters in the register REG (or other storage devices) for the microprocessor to read and calculate; third, in order to speed up the process of balancing and optimizing the signal quality of the lane, the microprocessor can also request the logical physical layer L1 to preprocess the information read from the electrical physical layer L2, and store the preprocessed result in the register REG (or other storage devices) for the microprocessor MCU to read.

The electrical physical layer L2 mainly includes two features: first, to transmit the training sequence (that is, a set of data that conforms to the communication specification) sent by the logical physical layer L1; second, according to the configuration of the logical physical layer L1 or the register REG, the received related parameters (e.g., electrical parameters and/or signal quality) are measured.

In one embodiment, each connection port P1 to Pn can exchange information with the processor CPU and the microprocessor MCU through the register REG, and the information includes but is not limited to the current link status (link width, link speed, etc.), signal quality parameters, coprocessor test requirements . . . etc. In one embodiment, a space is reserved in the register REG, which is specially used for communication between the processor CPU and the microprocessor MCU, and is used to transmit the relevant information (e.g., adjustment parameters) for balancing and optimizing the lane.

In one embodiment, the microprocessor MCU is actually a microprocessor MCU core in a chipset. By programming the firmware, the strategy of balancing and optimizing the lane can be flexibly configured. After the connection ports P1 to Pn each initiate the relevant request of the balancing and optimizing the lane through the interrupt signal INT1 to INTn, the microprocessor MCU can configure the relevant firmware according to the internal configuration. The related parameters of the received external device transmitter are adjusted through the register REG, and these parameters may include de-emphasis, preshoot, filter cursor, . . . and so on. The control logic physical layer L1 reads the relevant balancing and optimizing the lane parameters (such as the measurement results, that is, the parameters of the control logic physical layer L1 measured and passed to the microprocessor MCU), and reads back through the register REG. In one embodiment, the measurement results include eye diagram, eye width, eye height, bit error rate . . . etc.

In one embodiment, the processor CPU can control each connection port P1 to Pn by reading and writing the relevant register REG, or read the relevant state of each connection port P1 to Pn. The MCU can also communicate through the register REG space, such as passing adjustment parameters, preprocessing data, etc.

Figure 2A:
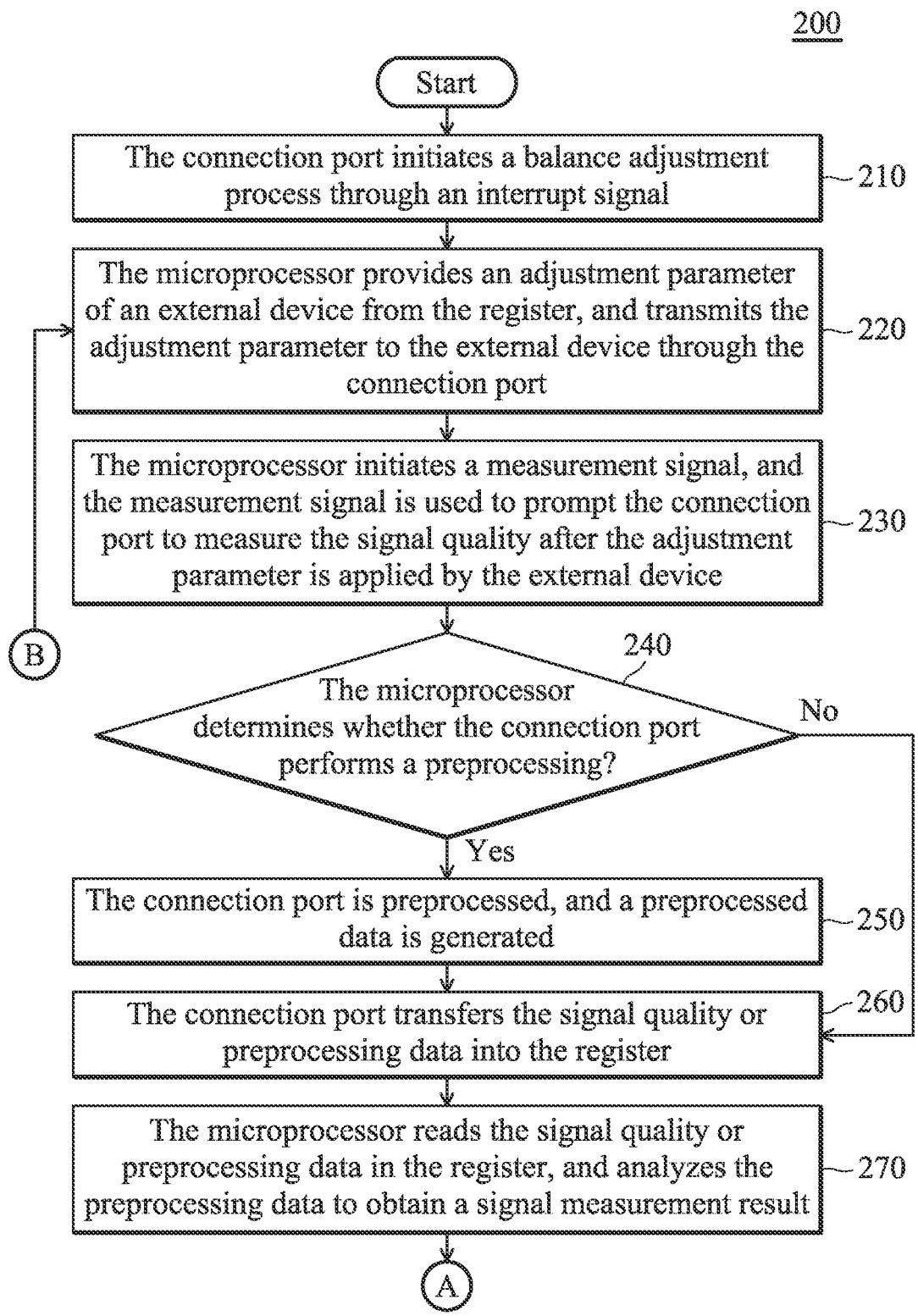
FIGS. 2A-2B are flowcharts of a link balance adjustment system in accordance with the first embodiment of the present disclosure.
Figure 2B:
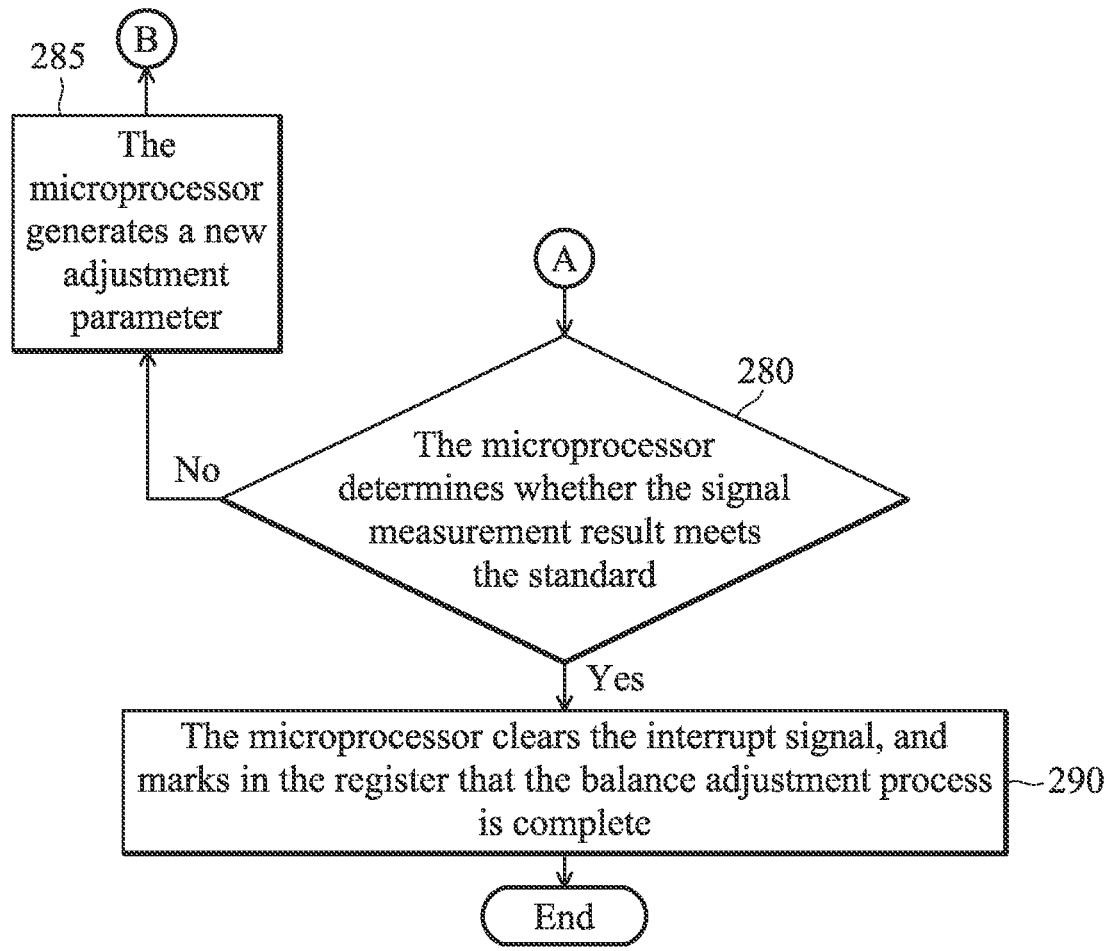

Next, please refer to FIGS. 2A-AB, which are flowcharts illustrating a link balance adjustment method 200 according to an embodiment of the present invention. To make the description clear, the following takes the connection port P1 as an example. In actual operation, the link balance adjustment method 200 can be used separately or simultaneously for the connection ports P1 to Pn.

The link balance adjustment method 200 may be implemented by the link balance adjustment system 100.

In step 210, the connection port P1 initiates a balance adjustment process through an interrupt signal INT1.

In high-speed serial applications, the link system needs to balance and optimize the signal quality of the link to ensure the accuracy of data transmission. Therefore, the connection port P1 initiates a balance adjustment process through an interrupt signal INT1.

In step 220, the microprocessor MCU provides an adjustment parameter of an external device from the register REG, and transmits the adjustment parameter to the external device through the connection port P1.

In one embodiment, a set of parameters manually measured by the programmer in advance, when starting the link balance adjustment system 100, the processor CPU or the microprocessor MCU directly inputs the set of adjustment parameters into the register REG of the link balance adjustment system 100.

In one embodiment, the adjustment parameter refers to adjusting parameters related to the other side sender, such as de-emphasis, preshoot, filter cursor, etc., which are stored in the register REG in advance middle.

In step 230, the microprocessor MCU initiates a measurement signal, and the measurement signal is used to prompt the connection port P1 to measure the signal quality after the adjustment parameter applied by the external device.

In one embodiment, the microprocessor MCU transmits the adjustment parameter to a physical layer of the connection port P1. The physical layer transmits the adjustment parameter to the external device through a training sequence. The microprocessor MCU initiates the measurement signal again. The measurement signal is used to prompt the connection port P1 to measure the signal quality after the adjustment parameter has been applied by the external device.

In one embodiment, the microprocessor MCU initiates a measurement signal, and the measurement signal is used to prompt a logical physical layer L1 in the connection port P1 to control an electrical physical layer L2 to measure the signal quality after the adjustment parameter has been applied by the external device.

In one embodiment, the connection port P1 transmits adjustment parameters to an external device. The microprocessor MCU sets a measurement parameter. The measurement parameter is used to measure the signal quality after the adjustment parameter applied to the external device, and the measurement parameter includes a target lane for signal measurement, a signal transmission evaluation time of each lane, or a signal quality test parameter. However, this is only an example, and the measurement parameters described in the present invention are not limited thereto.

In one embodiment, after the external device receives the adjustment parameter, the external device evaluates the adjustment parameter. When the external device evaluates that the adjustment parameter is not applicable, the external device sends a rejection signal to a logical physical layer L1 in the connection port P1.

In one embodiment, when the logical physical layer L1 receives the rejection signal, the logical physical layer L1 writes a rejection flag into the register REG. The microprocessor MCU reads the register REG to know that the external device evaluates that the adjustment parameter is not applicable.

In one embodiment, when the microprocessor MCU finishes setting the measurement parameters, the microprocessor MCU writes a flag indicating that the measurement parameter setting is completed in the register REG. After the logical physical layer L1 connected to the port P1 detects that the register REG contains a flag indicating that the measurement parameter setting is complete, the logical physical layer L1 controls an electrical physical layer L2 to perform signal measurement according to the measurement parameters.

In one embodiment, when the logical physical layer L1 detects that the microprocessor MCU has written a measurement parameter setting completion flag in the register REG, the logical physical layer L1 controls or indicates the electrical physical layer L2 to measure the signal of the target lane according to the settings of the microprocessor MCU. The signal measurement process can be performed serially or in parallel for all target lanes, depending on the implementation method. When using serial measurement, the logical physical layer L1 measures all the target lanes one by one according to the sequence set in advance. The design of this method is relatively simple, which is beneficial to reduce the area of related control. When parallel measurement is used, the logical physical layer L1 can measure all target lanes simultaneously. Thereby, it is beneficial to reduce the test time of all target lanes.

In step 240, the microprocessor MCU determines whether the connection port P1 performs a preprocessing.

When the microprocessor MCU determines that the connection port P1 is preprocessed, the step 250 is performed. When the microprocessor MCU determines that it is not necessary to prompt the connection port P1 to perform preprocessing, the step 260 is performed.

In one embodiment, the processor CPU can further determine whether to perform the preprocessing step.

In one embodiment, the step of determining whether to perform preprocessing by the processor CPU and/or the microprocessor MCU is based on a pre-defined rule.

In step 250, the connection port P1 is preprocessed, and a preprocessed data is generated.

In one embodiment, after the electrical physical layer L2 performs signal measurement according to the measurement parameters, in order to speed up the process of balancing and optimizing the signal quality of the lane, the logical physical layer L1 can preprocess the measurement results if necessary. That is, according to the requirements of the microprocessor MCU, some calculations are performed on the measurement results, and preprocessing data is generated.

In step 260, the connection port P1 transfers the signal quality or preprocessing data into the register REG.

In one embodiment, the connection port P1 stores the preprocessing data or signal measurement results of each target lane in the respective registers REG (or other storage devices) respectively.

In step 270, the microprocessor MCU reads the signal quality or preprocessing data in the register REG, and analyzes the preprocessing data to obtain the signal measurement result.

In one embodiment, the preprocessed data is the data preprocessed by performing some calculations on the original data of the signal quality, which can be regarded as the signal measurement result. And the microprocessor MCU can directly use the preprocessed data to analyze the signal quality.

In one embodiment, when the microprocessor MCU determines in step 240 that it is not necessary to prompt the connection port P1 to perform preprocessing, the connection port P1 transmits the signal quality directly to the register REG (step 260). In step 270, the microprocessor MCU reads the signal quality in the register REG, regards the signal quality as the signal measurement result, and analyzes the signal measurement result.

In one embodiment, when preprocessing is required, the connection port (such as connection port P1) will help the microprocessor MCU to calculate the raw data of the signal quality, and then transmit the calculated result to the microcomputer MCU through the register REG. This is beneficial to speed up the link balance adjustment process. When no preprocessing is required, the connection port (e.g., connection port P1) will transmit the raw data of the signal quality directly to the microprocessor MCU through the register REG.

In step 280, the microprocessor MCU determines whether the signal measurement result meets the standard.

When the microprocessor MCU determines that the signal measurement result conforms to the standard, the step 290 is performed. When the microprocessor MCU determines that the signal measurement result does not meet the standard, the step 285 is performed.

In one embodiment, after the external device receives the adjustment parameter, the external device evaluates the adjustment parameter. When the external device evaluates that the adjustment parameter is not applicable, in a training sequence sent by the physical layer of the external device, a corresponding reject bit is marked. When the connection port P1 receives the training sequence with the marked rejection bit, the connection port P1 informs the microprocessor MCU that the external device rejects the adjustment parameter through the register REG.

In one embodiment, when the microprocessor MCU learns that the external device evaluation adjustment parameter is not applicable, the microprocessor MCU can provide a new set of adjustment parameters according to the corresponding strategy configured by the firmware, and return to step 220 again to continue the steps of balancing and optimizing the lane.

In one embodiment, the microprocessor MCU reads the signal measurement result and the rejection signal of the other party to determine whether the signal quality or the adjustment parameter meets the standard.

In step 285, the microprocessor MCU generates a new adjustment parameter.

In one embodiment, the microprocessor MCU refers to the adjustment parameter (referring to the current adjustment parameter) to generate a new adjustment parameter. For example, the new adjustment parameter will be different from the adjustment parameter (referring to the current adjustment parameter).

In one embodiment, the corresponding strategy configured by the firmware is, for example, a strategy of first thick and then thin, which refers to gradually narrowing the parameter range to find more suitable new parameters. For example, first take 75 values out of 100 values, among these 75 values, take the 30th to 70th values, and find that the 50th value as an adjustment parameter has a better effect, then the range is reduced to, take the 35th to 65th values, and it is found that the 40th value is the best adjustment parameter, and the 40th value is used as the new adjustment parameter.

In one embodiment, the microprocessor MCU applies numerical dichotomy as a corresponding strategy for firmware configuration.

In step 290, the microprocessor MCU clears the interrupt signal, and marks in the register REG that the balance adjustment process is complete.

To sum up, the link balance adjustment method and the link balance adjustment system of the present invention can analyze the quality of the signal transmitted by the connection port or preprocessing result through the microprocessor, and analyze the signal measurement result. The microprocessor determines whether the signal measurement result meets the standard. When the microprocessor determines that the signal measurement result meets the standard, it clears the interrupt signal, and marks the completion of the balance adjustment process in the register. When the microprocessor determines that the signal measurement result does not meet the standard, it generates a new adjustment parameter, and continues to execute the link balance adjustment method until the balance adjustment process is complete. Therefore, in high-speed serial applications, the effect of adjusting and optimizing the signal quality of the lane is achieved to ensure the accuracy of data transmission.

For clarity of explanation, the present invention may in some cases be represented as including independent functional modules, these independent functional modules include functional modules having means, device elements, steps or routines in a method, and the method may be embodied in software, or a combination of hardware and software.

In some embodiments, the computer readable storage devices, media and memory may comprise a cable or wireless signal, etc., the signal comprising a bit stream. However, when referring to non-transitory computer-readable storage media, media such as energy, carrier waves, electromagnetic waves, and signals per se are expressly excluded.

According to the methods proposed in the above-mentioned embodiments, these methods can be implemented by computer-executable instructions stored in or usable in a computer-readable medium. The instructions may include instructions and data that cause or otherwise configure a general purpose computer, special purpose computer or special purpose processor device to perform certain functions or sets of functions. Some computer resource usage can be accessed by the network. The computer-executable instructions (e.g., two bits) may be intermediate format instructions such as assembly language, firmware, or source code. Examples of computer-readable media that may be used to access instructions, use information, and/or create instructions during the methods of the above-described embodiments may include magnetic or optical disks, flash memory, USB devices with non-transitory storage, and network storage device etc.

Device implementation methods disclosed in accordance with embodiments of the present invention may include hardware, firmware, and/or software, and may take any of various form factors. Examples of such form factors may generally include notebook computers, smartphones, small form factor personal computers, personal digital assistants, rackmount devices, standalone devices, and the like. The functions described in the present invention may also be embodied in peripheral devices or add-in cards. This function can also be implemented in different chips in a single device or a circuit board between different processors by the above method.

The computing resources used to transmit instructions, execute the instructions, and other instructions and media supporting the structure of the computing resources are the means for providing the functions of the present invention.

The present invention provides a system and an implementation method for charging and discharging a high-efficiency battery system of a server system in a data center. The foregoing specific embodiments have disclosed how selective operations are employed in different instructions, and other embodiments may be combined with selective operations in different instructions. For clarity of explanation, the present invention may be represented as including independent functional modules in some cases. These independent functional modules include functional modules having means, device elements, steps or routines in a method, which can be embodied in software or a combination of hardware and software.

The different embodiments may also be implemented in various operating environments, which in some cases may include one or more server computers, user computers, or computing devices that may be used to operate any number of applications. User or client devices may include any number of general-purpose personal computers (e.g., desktop or laptop computers running a standard operating system), and cellular, wireless, and handheld device. The system of the present invention may also include a number of workstations running any of a variety of commercially available operating systems, as well as other known applications for development and database management purposes. These devices may also include other electronic devices such as dummy terminals, thin-clients, gaming systems, and other devices that can communicate over a network.

The scope of the above-mentioned embodiment, or part of the content is realized by hardware, and the present invention can be realized by any of the following technologies, or a combination of these technologies: a discrete logic circuit with logic gates to realize logic functions on data signals; an application specific integrated circuit (ASIC) with appropriate combinational logic gates; programmable hardware such as a programmable gate array (PGA); a field programmable gate array (FPGA), etc.

Most embodiments utilize at least one network well known to those skilled in the art to support any of a variety of communications using commercially available protocols, such as TCP/IP, OSI, FTP, UPnP, NFS, CIFS, AppleTalk, and the like. The network may be a local area network, a wide area network, a virtual private network, the Internet, an intranet, an extranet, a public switched telephone network, an infrared network network), a wireless network, and a combination of any of the foregoing.

The methods of the above-described embodiments may be implemented by computer-executable instructions stored on or available on a computer-readable medium. The instructions may include instructions and data that cause or otherwise configure a general purpose computer, special purpose computer or special purpose processor device to perform certain functions or set of functions. Some computer resource usage can be accessed by the network. The computer-executable instructions (e.g., two bits) may be intermediate format instructions such as assembly language, firmware, or source code. Examples of computer-readable media that may be used to access instructions, use information, and/or create instructions during the methods of the above-described embodiments may include magnetic or optical disks, flash memory, USB devices with non-transitory storage, and network storage device etc.

Device implementation methods disclosed in accordance with embodiments of the present invention may include hardware, firmware, and/or software, and may take any of various form factors. Examples of such form factors may generally include server computers, laptop computers, smart phones, small form factor personal computers, personal digital assistants, and the like. The functions described in the present invention may also be embodied in peripheral devices or add-in cards. This function can also be implemented in different chips in a single device or a circuit board between different processors by the above method.

In embodiments using a web server, the web server may run any of a variety of servers or mid-tier applications, and may include HTTP servers, FTP servers, CGI servers, data servers, Java Servers and Commercial Servers. These servers may also execute programs or scripts in response to user device requests, such as by executing one or more web servers. The web server can be implemented by one or more scripts or programs written in any programming language, such as Java®, C, C#, C++ or any scripting language such as Perl, Python or TCL in combination with it. These servers may also include database servers and any commercially available products in the open market.

The server system may include the various data stores, other memories, and storage media described above, and may be resident in various locations, such as a storage media on one or more computers or remotely from any computer in a network. In the setting of a particular embodiment, the information may reside in a storage area network (SAN) well known to those skilled in the art. Likewise, any files necessary to perform functions belonging to a computer, server or other network device may be considered for local or remote storage. Wherein, a system includes computerized devices, which may include hardware elements electrically coupled by a bus, and these hardware elements include, for example, at least one central processing unit, at least one input device (e.g., a mouse, a keyboard, a controller, a touch control display element or keypad) and at least one output device (e.g., a display device, printer or speaker). The system may also include one or more storage devices, such as disk drives, optical storage devices, solid-state storage devices (e.g., random access memory or read-only memory), as well as removable media devices, memory cards, flash cards, etc.

The above device may also include a computer-readable storage medium reader, a communication device (e.g., a modem, a network card (wireless or wired), an infrared computing device) and the aforementioned working memory. The computer-readable storage medium reader may be connected or configured to receive a computer-readable storage medium, which may be remote, local, fixed and/or removable storage devices and storage media, which may be used for temporary to contain, store, generate and retrieve computer readable information locally and/or permanently. The systems and various devices also typically include a number of software applications, modules, services, or other elements located on at least one working memory device, and include an operating system and applications, such as client applications or web browsers. It will be appreciated that many different variations of the various embodiments described above are possible. For example, customized hardware may also be used and/or certain elements may be implemented in hardware, software (including portable software such as applets), or both. It can even be connected to other computing devices such as network input/output devices.

Storage media and computer-readable media for embodying program code, portions of program code, may include any suitable known media (including storage media and computing media) such as, but not limited to, transitory and non-transitory, removable and Non-removable media implemented by any method or technology for storing and/or generating data, which may be computer readable instructions, data structures, program modules or other data. The storage media and computer readable media also include RAM, ROM, EPROM, EEPROM, flash memory or other memory technologies, CD-ROM, DVD or other optical storage, magnetic cassettes, magnetic tape, magnetic disk storage, other magnetic storage devices or other Any medium that can store the required data and that can be read by the system device. Based on the techniques and teachings provided by the present invention, those skilled in the art will understand other ways and/or methods to implement various possibilities of the present invention.

Although the present invention has been disclosed above with examples, it is not intended to limit the present invention. Any person skilled in the art can make various changes and modifications without departing from the spirit and scope of the present case. The scope of protection shall be defined by the appended claims.

What is claimed is:

1. A link balance adjustment system, comprising:
   a connection port, configured to initiate a balance adjustment process through an interrupt signal; and
   a microprocessor, configured to transmit the adjustment parameter to the connection port according to an adjustment parameter of an external device provide by a register and; wherein the microprocessor initiates a measurement signal, and the measurement signal is used to enable the connection port to measure signal quality after the adjustment parameter is applied by the external device;
wherein the microprocessor determines whether the connection port performs a preprocessing;
when the microprocessor determines that the connection port performs the preprocessing, the connection port performs the preprocessing and generates preprocessing data; the connection port transmits the preprocessing data to the register; the microprocessor reads the preprocessing data in the register or the signal quality, and the microprocessor determines whether a signal measurement result meets a standard according to the preprocessed data or the signal quality, when the microprocessor determines that the signal measurement result meets the standard, the microprocessor clears the interrupt signal, and marks in the register that the balance adjustment process is complete.

2. The link balance adjustment system of claim 1, wherein the adjustment parameter is stored in the register.

3. The link balance adjustment system of claim 1, wherein the microprocessor transmits the adjustment parameter to a physical layer of the connection port, and the physical layer transmits the adjustment parameter to the external device through a training sequence.

4. The link balance adjustment system of claim 1, wherein the microprocessor initiates the measurement signal, and the measurement signal is used to prompt a logical physical layer in the connection port to control an electrical physical layer to measure the signal quality after the adjustment parameter is applied by the external device.

5. The link balance adjustment system of claim 1, wherein when the microprocessor determines that the connection port does not perform the preprocessing, the connection port transmits the signal quality directly to the register, the microprocessor reads the signal quality in the register, regards the signal quality as the signal measurement result, and analyzes the signal measurement result.

6. The link balance adjustment system of claim 1, wherein when the microprocessor determines that the signal measurement result does not meet the standard, a new adjustment parameter is generated.

7. The link balance adjustment system of claim 1, wherein after the external device receives the adjustment parameter, the external device evaluates the adjustment parameter, when the external device evaluates that the adjustment parameter is not applicable, a corresponding rejection bit in a training sequence is marked, wherein the training sequence is sent by the physical layer of the external device, and when the training sequence with the marked rejection bit is received by the connection port, the connection port informs the microprocessor that the external device rejects the adjustment parameter through the register.

8. The link balance adjustment system of claim 7, wherein when a logical physical layer receives the rejection signal, the logical physical layer writes a rejection flag into the register, and the microprocessor reads the register to acknowledge that the external device evaluates that the adjustment parameter is not applicable.

9. The link balance adjustment system of claim 1, wherein the connection port transmits the adjustment parameter to the external device, the microprocessor sets a measurement parameter, the measurement parameter is used to measure the signal quality after the adjustment parameter has been applied by the external device, and the measurement parameter includes a signal measurement target lane, a signal transmission evaluation time for each lane, or a signal quality test parameter.

10. The link balance adjustment system of claim 9, wherein when the microprocessor finishes setting the measurement parameter, the microprocessor writes a mark indicating that the measurement parameter setting is complete in the register, a logical physical layer of the connection port detects that the register includes the mark indicating that the measurement parameter setting is complete, and the logical physical layer controls an electrical physical layer to perform signal measurement according to the measurement parameter.

11. A link balance adjustment method, comprising:
initiating an balance adjustment process through an interrupt signal by a connection port;
according to an adjustment parameter of an external device provided by a register, transmitting the adjustment parameter to the connection port via a microprocessor; wherein the microprocessor initiates a measurement signal, and the measurement signal is used to enable the connection port to measure the signal quality after the adjustment parameter is applied by the external device; and
determining whether the connection port performs a preprocessing via the microprocessor;
when the microprocessor determines that the connection port performs the preprocessing, the connection port performs the preprocessing and generates preprocessing data; the connection port transmits the preprocessing data to the register; the microprocessor reads the preprocessing data in the register or the signal quality, and the microprocessor determines whether the signal measurement result meets the standard according to the preprocessed data or the signal quality, and when the microprocessor determines that the signal measurement result meets the standard, the microprocessor clears the interrupt signal, and marks in the register that the balance adjustment process is complete.

12. The link balance adjustment method of claim 11, wherein the adjustment parameter is stored in the register.

13. The link balance adjustment method of claim 11, further comprising:
transmitting the adjustment parameter to a physical layer of the connection port via the microprocessor; wherein the physical layer transmits the adjustment parameter to the external device through a training sequence.

14. The link balance adjustment method of claim 11, further comprising:
initiating the measurement signal through an action of the microprocessor; wherein the measurement signal is used to prompt a logical physical layer in the connection port to control an electrical physical layer to measure the signal quality after the adjustment parameter is applied by the external device.

15. The link balance adjustment method of claim 11, wherein when the microprocessor determines that the connection port does not perform the preprocessing, the connection port transmits the signal quality directly to the register, the microprocessor reads the signal quality in the register, regards the signal quality as the signal measurement result, and analyzes the signal measurement result.

16. The link balance adjustment method of claim 11, wherein when the microprocessor determines that the signal measurement result does not meet the standard, a new adjustment parameter is generated.

17. The link balance adjustment method of claim 11, wherein after the external device receives the adjustment parameter, the external device evaluates the adjustment parameter, when the external device evaluates that the adjustment parameter is not applicable, a corresponding rejection bit in a training sequence is marked, wherein the training sequence is sent by the physical layer of the external device, and when the training sequence with the marked rejection bit is received by the connection port, the connection port informs the microprocessor that the external device rejects the adjustment parameter through the register.

18. The link balance adjustment method of claim 17, wherein when a logical physical layer receives the rejection signal, the logical physical layer writes a rejection flag into the register, and the microprocessor reads the register to acknowledge that the external device evaluates that the adjustment parameter is not applicable.

19. The link balance adjustment method of claim 11, further comprising:

transmitting the adjustment parameter to the external device via the connection port; wherein the microprocessor sets a measurement parameter, the measurement parameter is used to measure the signal quality after the adjustment parameter has been applied by the external device, and the measurement parameter includes a signal measurement target lane, a signal transmission evaluation time for each lane, or a signal quality test parameter.

20. The link balance adjustment method of claim 19, wherein when the microprocessor finishes setting the measurement parameter, the microprocessor writes a mark indicating that the measurement parameter setting is complete in the register, a logical physical layer of the connection port detects that the register includes the mark indicating that the measurement parameter setting is complete, and the logical physical layer controls an electrical physical layer to perform signal measurement according to the measurement parameter.

* * * * *